(12) United States Patent
Manetti

(10) Patent No.: US 8,147,967 B2
(45) Date of Patent: Apr. 3, 2012

(54) DECORATIVE PANEL AND METHOD OF PRODUCTION THEREOF

(75) Inventor: Bonaccorso Manetti, Florence (IT)

(73) Assignee: Giusto Manetti Battiloro S.p.A., Florence (IT)

(*) Notice: Subject to any disclaimer, the term of this patent is extended or adjusted under 35 U.S.C. 154(b) by 432 days.

(21) Appl. No.: 12/437,689

(22) Filed: May 8, 2009

(65) Prior Publication Data
US 2009/0324962 A1  Dec. 31, 2009

(30) Foreign Application Priority Data

May 9, 2008 (EP) ..................................... 08425319

(51) Int. Cl.
*B32B 27/40* (2006.01)
*B32B 37/00* (2006.01)
(52) U.S. Cl. ..................................... 428/424.2; 156/278
(58) Field of Classification Search .................. 156/278; 428/424.2
See application file for complete search history.

(56) References Cited

U.S. PATENT DOCUMENTS

| 6,110,316 A * | 8/2000 | Kobayashi et al. ........... 156/230 |
| 2003/0190485 A1 | 10/2003 | Takatsuki et al. |
| 2004/0219366 A1 | 11/2004 | Johnson |
| 2007/0110965 A1 * | 5/2007 | Bergsmann ................ 428/195.1 |

FOREIGN PATENT DOCUMENTS

EP    1 785 268    5/2007

* cited by examiner

*Primary Examiner* — Thao T. Tran
(74) *Attorney, Agent, or Firm* — Ladas & Parry LLP

(57) ABSTRACT

The decorative panel comprises a first backing layer made, according to its use, from a choice of different materials and geometrically defined by a base wall which in use is fastened, for example by gluing, to the surface to be covered, an upper wall parallel and opposite to said base wall and several side walls, a second layer which is arranged so as to cover the upper wall and the side walls and which consists of a pigmented two-component polyurethane base coat preferably pigmented using iron oxide pigments, a third layer which is arranged so as to cover the second layer and consists of a one-component solvent-based preferably self-curing acrylic resin mordant, a fourth layer which is arranged so as to cover the third layer and consists of a precious metal leaf for instance gold, silver or platinum leaf, and a fifth layer which is arranged so as to cover the fourth layer and is made of transparent material.

18 Claims, 2 Drawing Sheets

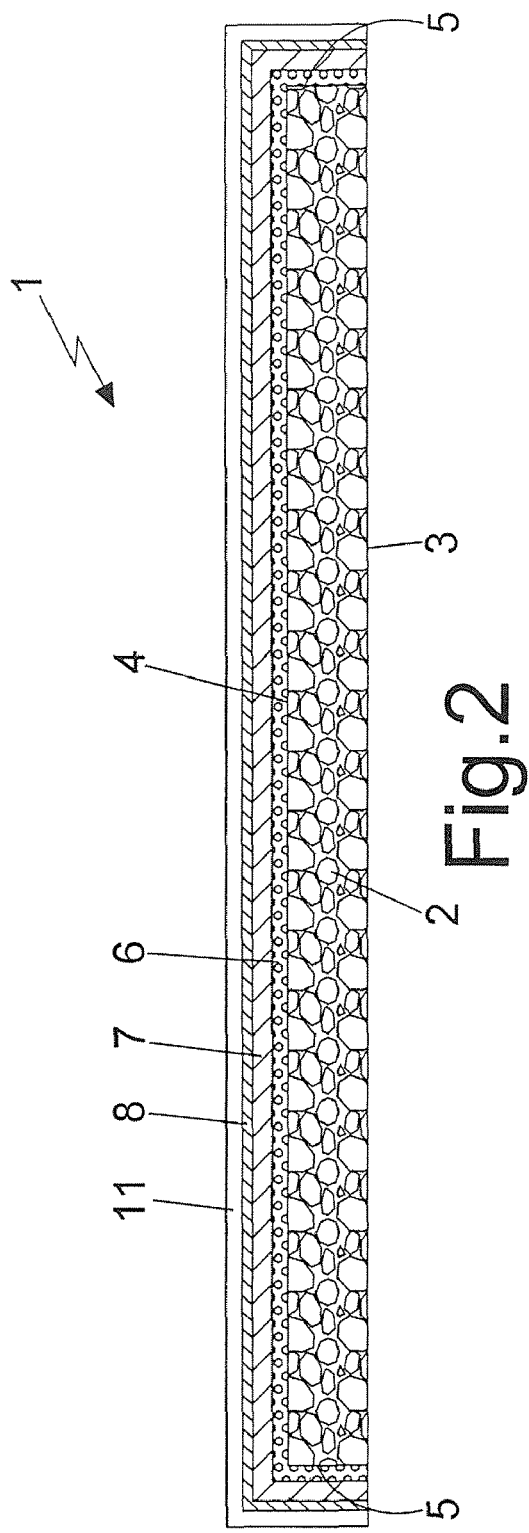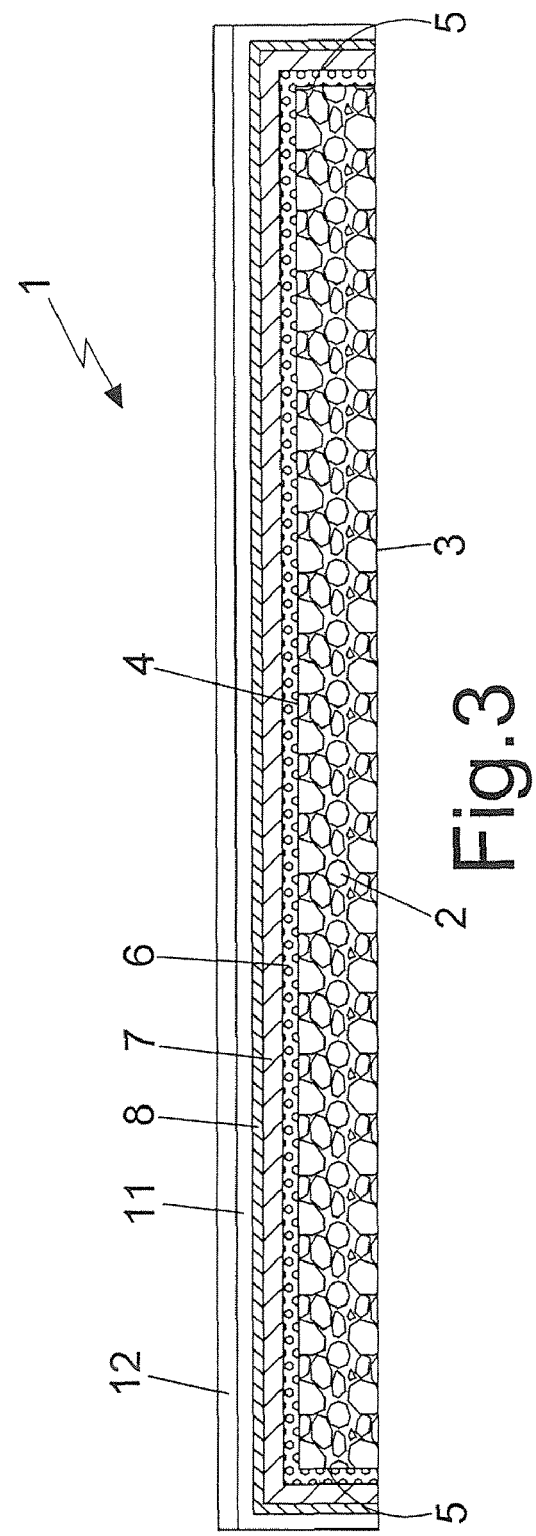

DECORATIVE PANEL AND METHOD OF PRODUCTION THEREOF

The present invention relates to a decorative panel for covering masonry, indoor and outdoor furniture or fittings, floors and building facades and cladding.

The present invention also relates to a method for producing said panel.

BACKGROUND OF THE INVENTION

As is known, buildings provided with a covering (interior and/or exterior) which incorporates a layer of gold leaf or another precious metal such as silver or platinum leaf, etc., are becoming increasingly common. The existing methods used to cover parts of a building consist first of all in fastening strips made, according to their use, from a variety of materials such as, for example, terracotta, stone, plastic, pressed pasteboard, etc., to said parts. When said strips have been secured firmly in place their visible surface is treated with solvents before applying a layer of precious metal.

It is immediately apparent that the methods used to produce said covering present a plurality of drawbacks.

In particular, the visible surface of the strips is treated and the precious metal is applied after fastening the strips to the building. It is clear that treating said strips with solvents and then applying the precious metal is a complex and costly operation (for instance in case of covering sky-scrapers) and not environmentally friendly, in that toxic substances (solvents) are used in the open air and not in controlled environments. Moreover, the safety concerns for the workers carrying out said operations and the considerable amount of time it takes to perform them must be considered, also bearing in mind that these operations cannot be performed immediately one after the other, but require a sufficient amount of time between one operation and the next, for example for the solvent to dry; said drying process does not take place in a controlled environment, and occurs without any protection from atmospheric factors which could affect the treatment of the visible surface of the strip. Lastly, when the covering is obtained using the method described above the gaps between one strip and the adjacent strips are visible. Although the covering is expensive, the gaps between one strip and the adjacent strips cannot be rendered invisible using the current method of application; said gaps are unattractive.

SUMMARY OF THE INVENTION

The purpose of the present invention is to produce a decorative panel that can be applied simply and quickly.

Another purpose of the present invention is to provide a method for producing said decorative panel.

According to the present invention a decorative panel is produced, characterized in that it comprises:

a first backing layer made, according to its use, from a choice of different materials, such as for instance terracotta, stone, plastic, pressed pasteboard, etc. and geometrically defined by a base wall which in use is fastened, for example by gluing, to the surface to be covered, an upper wall parallel and opposite to said base wall and a plurality of side walls;

a second layer which is arranged so as to cover said upper wall and at least partially said side walls, said second layer consisting of a pigmented two-component polyurethane base coat preferably pigmented using iron oxide pigments;

a third layer which is arranged so as to cover said second layer and consists of a one-component solvent-based preferably self-curing acrylic resin mordant;

a fourth layer which is arranged so as to cover said third layer and consists of a precious metal leaf, for instance gold, silver or platinum leaf or a leaf of another precious metal or alloy of precious metal; and a fifth layer which is arranged so as to cover said fourth layer and is made of a transparent material.

According to the present invention a method is also provided for producing a decorative panel characterized in that it comprises:

a first phase during which a second layer is applied to walls of a first layer made, according to their use, from a choice of different materials such as for instance terracotta, stone, plastic, pressed pasteboard, etc., by means of spray painting a pigmented two-component polyurethane base coat;

a second phase during which a solvent-based mordant is applied to said second layer by means of spray painting in order to define a third layer;

a third phase during which the precious metal is applied to said third layer, preferably in the form of a precious metal leaf for instance gold, silver or platinum leaf or a leaf of another precious metal or alloy of precious metals in order to define a fourth layer; and a fourth phase during which a fifth layer of transparent material is applied to said fourth layer.

BRIEF DESCRIPTION OF THE DRAWINGS

The present invention will now be described with reference to the attached drawings, illustrating several embodiments thereof, in which:

FIG. 2 is a cross-sectional view, according to a first embodiment, of the panel of FIG. 1; and FIG. 3 is a cross-sectional view, according to a second embodiment, of the panel of FIG. 1.

DETAILED DESCRIPTION OF THE INVENTION

Figure 1:
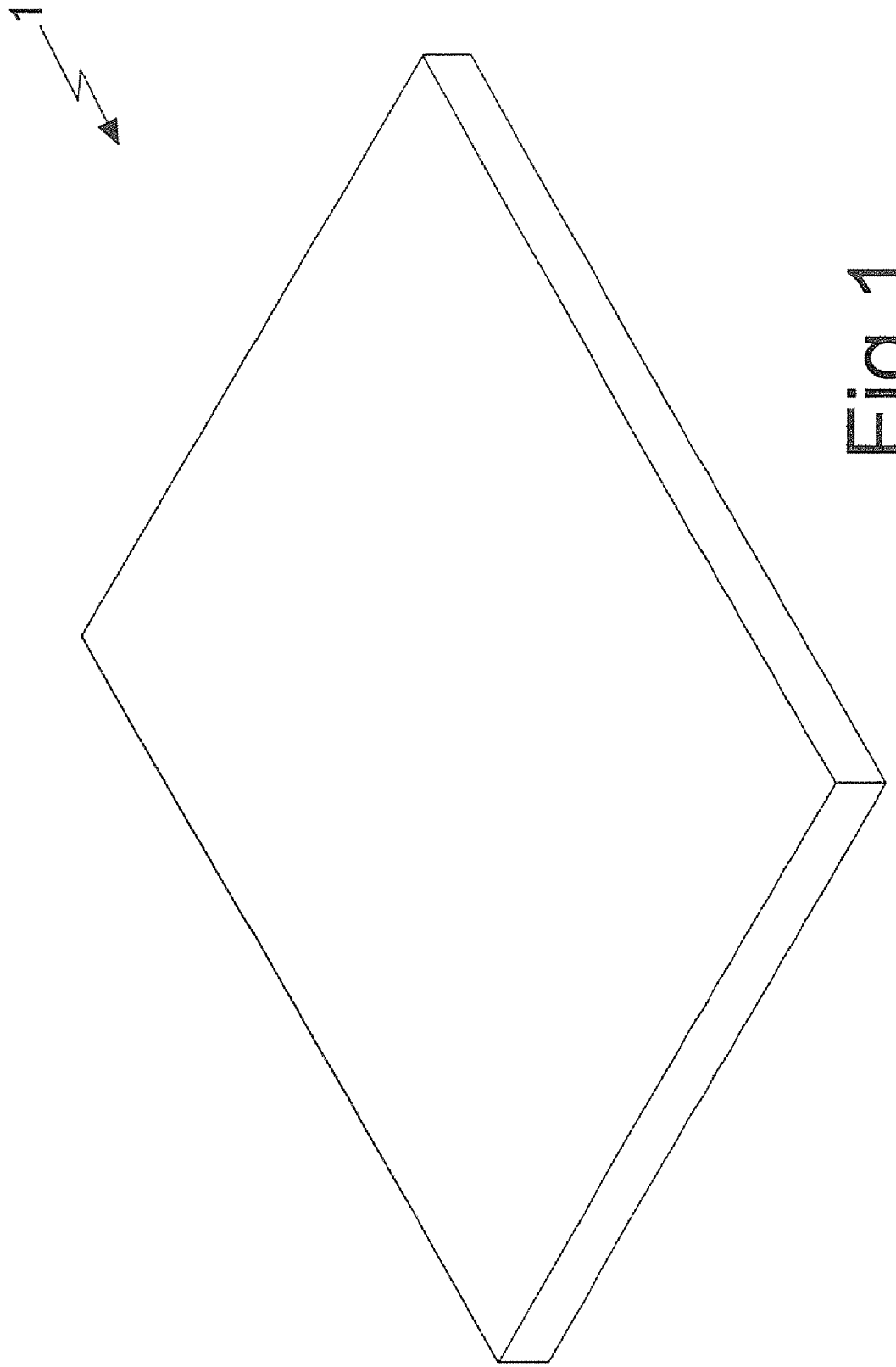
FIG. 1 is a perspective view of a decorative panel produced according to the present invention.

With reference to FIGS. 1 and 2, number 1 is used to indicate, as a whole, a decorative panel for covering masonry, indoor and outdoor furniture or fittings and building facades and cladding. The panel 1 comprises a first backing layer 2 made from a choice of different materials such as for instance terracotta, stone, plastic, pressed pasteboard, etc. For example if used to cover the outside of buildings the layer 2 should preferably be made of terracotta, stone, ceramic or metal, whereas if used to cover indoor furniture or fittings and interior walls, the layer 2 should preferably be made of one of the other materials listed above. The panel 1 illustrated in FIG. 1 has a rectangular perimetric profile, but for some applications such as for example mosaics or for covering particular surfaces the perimetric profile could differ from that illustrated. Moreover the shape of the panel 1 shown in FIG. 1 is flat, but for some applications the shape of the panel 1 could be curved similar in shape to a roof tile or L-shaped. The layer 2 has a constant thickness and is geometrically defined by a base wall 3 which in use is fastened, for example by means of gluing, to the surface to be covered, an upper wall 4 parallel and opposite to the wall 3 and four side walls 5. In some applications and for certain materials the base wall 3 could be shaped so that the adhesive is able to make it adhere better to the surface to be covered.

The panel 1 also comprises a second layer 6 which is arranged so as to cover the wall 4 and the walls 5; the latter may be partially or completely covered. The layer 6 is simply a pigmented two-component polyurethane base coat preferably pigmented using iron oxide pigments. The panel 1 comprises a third layer 7 which is arranged so as to cover the second layer 6. Said third layer 7 is simply a one-component solvent-based preferably self-curing acrylic resin mordant. The panel 1 also comprises a fourth layer 8 which is arranged so as to cover the third layer 7. Said fourth layer 8 is a precious metal leaf, for instance gold, silver or platinum leaf or a leaf of another precious metal or alloy of precious metals. Lastly, the panel 1 comprises a fifth layer 11 which is arranged so as to cover the fourth layer 8. The fifth layer 11 is simply a transparent paint, that is a two-component glossy acrylic finish in which the second component is an aliphatic with anti-yellowing properties.

According to a second embodiment illustrated in FIG. 3, the part of the layer 11 relating to the area defined by the wall 4 is covered with a sixth layer 12 of transparent glass or transparent plastic. According to a third embodiment which is not illustrated, instead of the layer 11 the layer 8 could be covered with a layer of transparent glass or transparent plastic similar to the layer 12.

The method for producing the panel 1 consists of:

a first phase in which the walls 4 and 5 of the layer 2 are cleaned to remove any residual dust or particles;

a second phase in which the layer 6 is applied to the walls 4 and 5 by means of spray painting the pigmented two-component polyurethane base coat;

a third phase in which the semi-finished product defined by the layers 2 and 6 is dried in a controlled atmosphere environment for a fixed time of between 4 and 6 hours.

a fourth phase in which the solvent-based mordant is applied to the layer 6 by means of a spray painting process in order to define the layer 7;

a fifth phase in which the semi-finished product defined by the layers 2, 6 and 7 is dried in a controlled atmosphere environment for a fixed time of between 4 and 6 hours;

a sixth phase in which the precious metal is applied to the layer 7 in order to define the layer 8; and a seventh phase in which the two-component glossy acrylic finish is applied by means of a spray painting process to the layer 8 in order to define the layer 11.

The seventh phase is preferably performed in several steps and in particular the layer 11 can be defined by three applications of two-component acrylic finish in which between one application and the next the semi-finished product is allowed to dry for approximately 3 hours in a controlled atmosphere environment. For the panel 1 illustrated in FIG. 3, the method includes an eighth phase in which the layer 12 is glued to the layer 11. A further variant could envisage the seventh phase including the application of a layer of transparent material (glass or plastic) to the layer 8 instead of the layer 11 described above.

The numerous advantages of the present invention are apparent from the above description.

In particular the panel that is produced is ready to be fitted to the surface to be covered without requiring any further finishing operations. Covering the surface simply involves fastening a plurality of panels to the surface to be covered. It is clear that the covering is applied quickly, inexpensively and without any particular safety concerns for the workers involved. Moreover, during the application of the covering, there are no environmental concerns as the processes that could be a cause of concern for the environment are performed during the production of the panels in a controlled environment. The panels are mounted on the surface to be covered when they are finished and there is thus no risk of aggressive atmospheric factors damaging the more delicate inner layers. Lastly, with the panels according to the present invention it is also possible to cover the side walls of said panels so that when mounted on the surfaces to be covered the gaps between one panel and the adjacent panels are not visible.

Moreover, it is clear that modifications and variations may be made to the panel 1 and to the method for the production thereof described and illustrated herein without departing from the scope of the present invention.

The invention claimed is:

1. Decorative panel comprising:
   a first backing layer (2) made from a first covering material selected from the group consisting of terracotta, stone, plastic, and pressed pasteboard, and geometrically defined by a base wall (3) which in use is fastened, by gluing, to a surface to be covered, an upper wall (4) parallel and opposite said base wall (3) and a plurality of side walls (5);
   a second layer (6) which is arranged so as to cover said upper wall (4) and at least partially said side walls (5), said second layer (6) consisting of a pigmented two-component polyurethane base coat pigmented with iron oxide pigments;
   a third layer (7) which is arranged so as to cover said second layer (6) and consists of a one-component solvent-based and self-curing acrylic resin mordant;
   a fourth layer (8) which is arranged so as to cover said third layer (7) and consists of a leaf of precious metal, said precious metal being selected from the group consisting of gold, silver, platinum and alloys thereof; and
   a fifth layer (11) which is arranged so as to cover said fourth layer (8) and is made of a transparent material.

2. Decorative panel according to claim 1, wherein said fifth layer (11) consists of a transparent paint.

3. Decorative panel according to claim 2, wherein said paint is a two-component glossy acrylic finish in which the second component is an aliphatic with anti-yellowing properties.

4. Decorative panel according to claim 2 comprising a sixth layer (12) which is arranged so as to cover said fifth layer (11) and is made from transparent glass or transparent plastic.

5. Decorative panel according to claim 1, wherein said fifth layer (11) is made of transparent glass or transparent plastic.

6. Decorative panel according to claim 1, wherein said base wall (3) of said first backing layer (2) is shaped to enhance adherence of the base wall to the surface with an adhesive.

7. Decorative panel according to claim 1, wherein said first layer (2) has a constant thickness.

8. Decorative panel according to claim 1, wherein the decorative panel has a flat shape.

9. Decorative panel according to claim 1, wherein the decorative panel is curved.

10. Decorative panel according to claim 1, wherein the decorative panel is L-shaped.

11. Decorative panel according to claim 1, wherein the decorative panel has a rectangular perimetric profile.

12. Method for producing the decorative panel of claim 1 comprising:
   a first phase during which the second layer (6) is applied to the upper wall and side walls (4 and 5) of the first layer by spray painting a pigmented two-component polyurethane base coat;
   a second phase during which a solvent-based mordant is applied to said second layer (6) by spray painting in order to define the third layer (7);
   a third phase during which the precious metal is applied to said third layer (7) in order to define the fourth layer (8); and a fourth phase during which the fifth layer (11 and/or 12) of transparent material is applied to said fourth layer (8).

13. Method according to claim 12 comprising, between said first phase and said second phase, an intermediate phase during which a the semi-finished product defined by said first and second layers (2 and 6) is dried in a controlled atmosphere environment for a period of time.

14. Method according to claim 12 comprising, between said second phase and said third phase, an intermediate phase during which a semi-finished product defined by said first, second and third layers (2, 6 and 7) is dried in a controlled atmosphere environment for a period of time.

15. Method according to claim 12, comprising applying during said fourth phase, a two-component glossy acrylic finishing coat by spray painting to define said fifth layer (11).

16. Method according to claim 12, comprising applying, during said fourth phase, said fifth layer (11) by means of gluing, said fifth layer consisting of transparent glass or transparent plastic.

17. Method according to claim 12, comprising a fifth phase during which a sixth layer (12) consisting of transparent glass or transparent plastic is applied to said fifth layer (11).

18. Method according to claim 15, wherein said fourth phase is performed in several steps so that said fifth layer (11) is made by a plurality of applications of two-component acrylic finish, wherein between each of the plurality of applications a semi-finished product is formed and allowed to dry for a period of time in a controlled atmosphere environment.

* * * * *